Aug. 29, 1933.                J. A. REESE                1,924,379
                                 TRAP
                           Filed Aug. 10, 1932        2 Sheets-Sheet 1
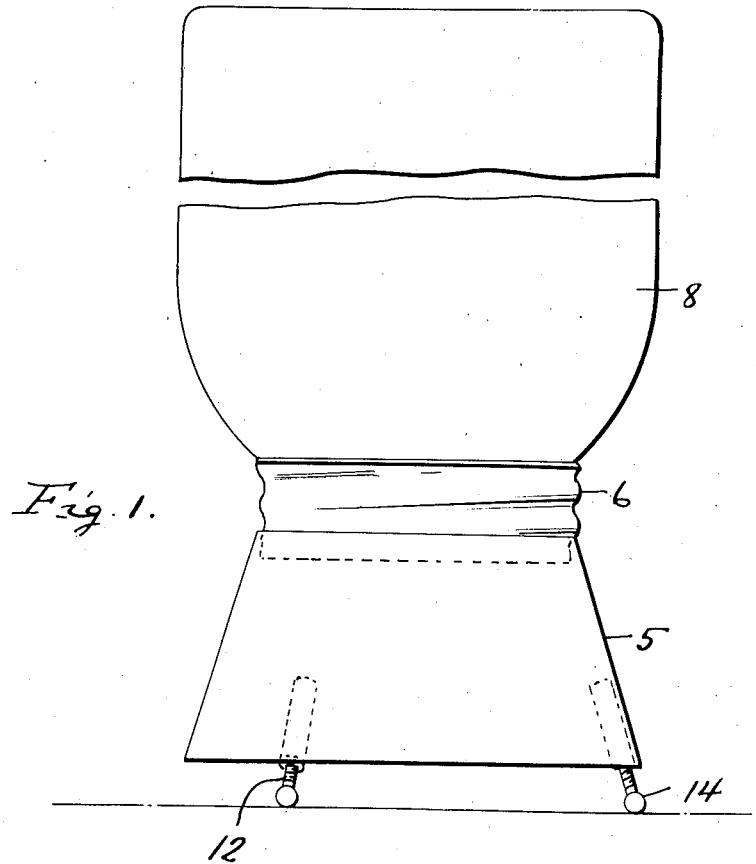
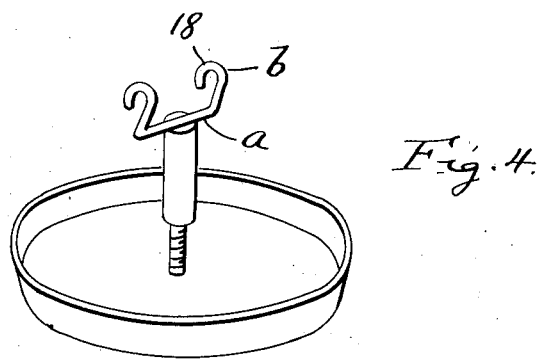
Inventor
James A. Reese
By Clarence A. O'Brien
                    Attorney Inventor
James A. Reese
By Clarence A. O'Brien
Attorney Patented Aug. 29, 1933

1,924,379

UNITED STATES PATENT OFFICE 1,924,379

TRAP

James A. Reese, Waynesburg, Pa.

Application August 10, 1932. Serial No. 628,228

4 Claims. (Cl. 43—122)

The present invention relates to a trap for flies and the like and particularly to an arrangement thereof whereby an ordinary fruit jar may be employed and whereby a neat and inexpensive construction is obtained and is very effective in operation.

The invention consists in the matters hereinafter set forth and particularly pointed out in the appended claims.

In the drawings:

Figure 1 is a side elevation of the trap embodying the features of my invention.

Figure 4 is a perspective view of the bait pan.

Figure 2:
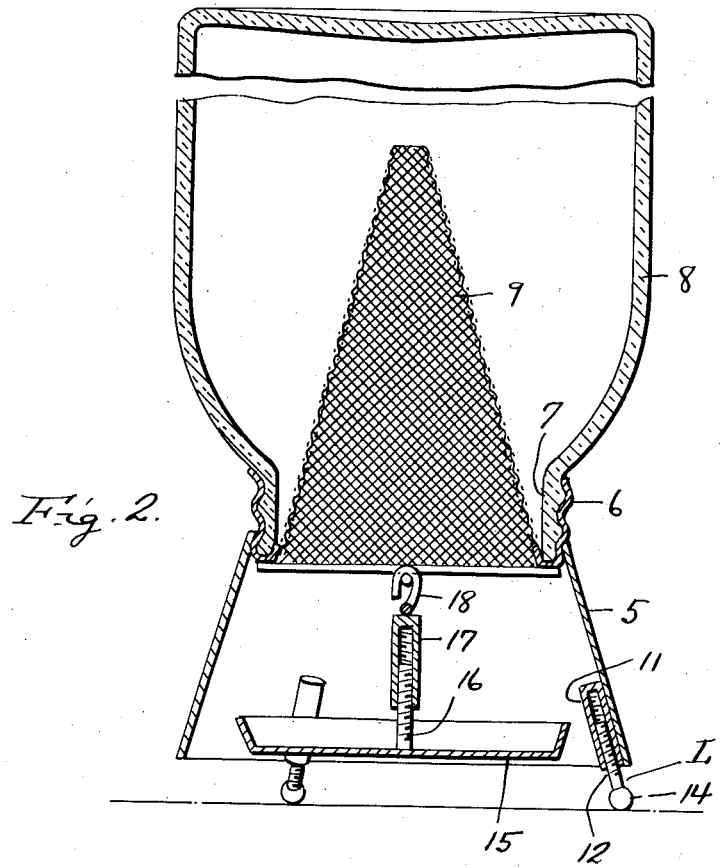
Figure 2 is a vertical section therethrough.
Figure 3:
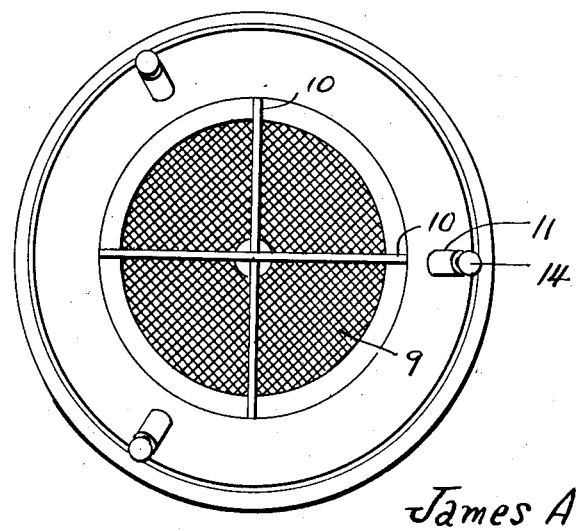
Figure 3 is a bottom plan view thereof with the bait pan removed.

Referring to the drawings in detail it will be seen that the numeral 5 denotes a frusto-conical body, the upper end of which is adapted to receive a threaded collar 6 on neck 7 of an inverted glass jar 8. Numeral 9 denotes a frusto-conical mesh member the base of which is formed, attached or otherwise secured to the collar 6 so as to extend up into the glass jar 8.

Numerals 10 denote cross rods at the base or bottom end of the mesh frusto-conical member 9. The frusto-conical body 5 is supported on legs L. Each leg L comprises an internally threaded member 11 to receive the threaded shank 12 extending from a foot ball 14. A bait pan 15 has rising from the center thereof a stem 16 threaded to engage in a sleeve 17 which is formed with a hook 18 to engage over one of the rods 10. This hook 18 is preferably of a bifurcated formation, that is, it comprises a cross member $a$ with hook portion $b$ projecting therefrom.

In operation the light through the jar attracts insects that crawl beneath the base so that the latter work their way up through the inner face of the screen 9 and out through the opening in the apex of this screen, owing to the semi-darkness in the base.

I claim:

1. A fly trap comprising a frusto-conical body provided at its largest end with supporting legs adjustably connected to the body, an inverted jar having a neck, a conoidal screen, a collar engaged with the screen at the largest end of the latter, said collar having threaded engagement with the neck of said jar and said screen extending inwardly of said jar when said collar is engaged with the neck, and said body at the smallest end thereof receiving the neck of the jar with the upper end edge of the body engaging about said collar for supporting the jar substantially perpendicularly; rigid means extending across said collar, a suspension tube having means at one end engaging the rigid means for suspending the tube from the collar internally of said body, and a bait pan having a central shank rising therefrom and screw threadedly engaged with said tube for supporting the pan pendantly within said body.

2. A fly trap comprising a substantially frusto-conical base having means at its lower end for supporting the lower edge of the base in elevated position, a collar at the upper end of the base, a conoidal screen connected with the collar and extending upwardly therefrom, an inverted jar having a neck screw threadedly engaged with said collar, a bait pan arranged within said base, and means detachably connected with the collar pendantly supporting the bait pan from the collar.

3. In a device of the character described, a hollow support open at its ends and provided at one end with adjustable legs for supporting the lower end of the support elevated with respect to a given surface, an inverted jar having a neck for insertion within the upper end of said support, a collar screw threadedly engaged with said neck, a conoidal screen engaged with the collar and extending therefrom inwardly of said jar, cross rods secured at their ends to the collar, a suspension tube provided at one end with a hook engaging the cross rods, and a bait pan provided with a centrally located shank rising therefrom and having threaded engagement with the suspension tube for pendantly supporting the pan within said hollow support.

4. In a fly trap, an inverted jar, a hollow frusto-conical support for the jar and open at each end, said jar having a neck for insertion within the upper end of said support, a collar screw threadedly engaged with said neck, a conoidal screen engaged with the collar and extending therefrom inwardly of the jar, a bait pan, means engaged with said pan and said collar for pendantly supporting said bait pan from said collar within said frusto-conical support, said pan being so positioned relative to said support that there is a substantial annular space between the inner wall of said frusto-conical support and the outer wall of the pan.

JAMES A. REESE.